US009463572B2

(12) United States Patent
Parente et al.

(10) Patent No.: US 9,463,572 B2
(45) Date of Patent: Oct. 11, 2016

(54) SYSTEM FOR REMOTELY SWINGING A GOLF CLUB

(76) Inventors: Eugene R. Parente, San Diego, CA (US); Sean J. Dynes, Escondido, CA (US); Timothy W. Bratcher, San Diego, CA (US)

(*) Notice: Subject to any disclaimer, the term of this patent is extended or adjusted under 35 U.S.C. 154(b) by 571 days.

(21) Appl. No.: 13/609,619

(22) Filed: Sep. 11, 2012

(65) Prior Publication Data

US 2014/0074425 A1 Mar. 13, 2014

(51) Int. Cl.
*B25J 9/16* (2006.01)

(52) U.S. Cl.
CPC .... *B25J 9/1679* (2013.01); *G05B 2219/40021* (2013.01)

(58) Field of Classification Search
None
See application file for complete search history.

(56) References Cited

U.S. PATENT DOCUMENTS

| 3,855,842 A | * | 12/1974 | Imabori et al. | 73/11.01 |
| 5,763,761 A | * | 6/1998 | Parente | A63B 60/42 473/453 |
| 6,415,671 B1 | | 7/2002 | Chien | |
| 6,569,030 B1 | | 5/2003 | Hamilton | |
| 7,789,742 B1 | * | 9/2010 | Murdock et al. | 463/3 |
| 8,882,606 B2 | | 11/2014 | Leech et al. | |
| 2010/0081116 A1 | * | 4/2010 | Barasch | A63B 24/0003 434/252 |
| 2011/0067507 A1 | | 3/2011 | Miyamae | |
| 2016/0158599 A1 | * | 6/2016 | Roslyakov | A63B 24/0021 700/92 |

FOREIGN PATENT DOCUMENTS

CN CN202206421 U 4/2012

* cited by examiner

*Primary Examiner* — Aditya Bhat
(74) *Attorney, Agent, or Firm* — Steven M. Greenberg, Esq.; Kara A. Brotman, Esq.; CRGO Law (57) ABSTRACT

A method, system, and computer program product for remote golf club swinging is provided. The method can include receiving in a robotic golf club swing fixture from a remote operator over a computer communications network a set of swing parameters defining different aspects of a golf club swing. The method also can include directing a plurality of robotic arms of the fixture to swing a coupled golf club according to the received swing parameters. The method yet further can include sensing a result of the swinging of the coupled golf club. Finally, the method can include transmitting data derived from the sensed result to the remote operator over the computer communications network.

24 Claims, 3 Drawing Sheets

SYSTEM FOR REMOTELY SWINGING A GOLF CLUB

BACKGROUND OF THE INVENTION

1. Field of the Invention

The present invention relates to golf clubs and, more particularly, to robotically swinging golf clubs.

2. Description of the Related Art

Golf is a difficult game that to master requires practice and skill. There is a high degree of interest in the game from golfers, but non-golfers as well find challenges such as trying to make a "hole-in-one" or attempting to hit the longest drive, off a golf tee, of interest. In order to experience these activities, a person must travel to a golf course, driving range, or golf simulator and use golf equipment to strike the ball.

Further, golf is a sport where the correct equipment is essential to the success and enjoyment of the activity. There are many different makes and models of golf equipment, including golf clubs. Each golf club manufacturer may make the same type of club slightly differently. For example, one manufacturer may produce a golf club with a shaft made from steel, while another equipment manufacturer may use graphite for the shaft. Testing a particular golf club or set of clubs helps to ensure a club is the correct size and weight for an individual player in addition to offering the right design characteristics for the player.

To test a golf club, a player has to travel to a hitting area, whether at a store, at a driving range, or use a golf simulator to play-test the club by striking golf balls. This, however, can be difficult and undesirable in an age of Internet shopping from the comfort of one's own home. Further, in order to play-test a golf club appropriately, a player should test in the same environment for each type of club. For example, if a player is testing woods, he/she should play them off the same lie, using the same type of tee or play surface, in order to get an accurate comparison between the clubs. Testing can involve hitting for distance, accuracy, and/or control.

BRIEF SUMMARY OF THE INVENTION

Embodiments of the present invention address deficiencies of the art in respect to remotely swinging golf clubs and provide a novel and non-obvious method, system, and computer program product for remotely swinging golf clubs. In an embodiment of the invention, a set of swing parameters from a remote operator can be received over a computer communications network. The swing parameters can define different aspects of a golf club swing. A plurality of robotic arms in a robotic golf club swing fixture can be directed to swing the attached golf club. A ball flight result of the swinging of the golf club can be sensed and the data derived from the sensed result can be transmitted to the remote operator over the computer communications network.

Another embodiment of the invention provides for a remote golf club swinging system. The system can include a server configured for communicative coupling to a web server and a computing device. A robotic golf club swing fixture also can be provided and can include a servo motor coupled to a controller, a data capture apparatus coupled to the controller, and a plurality of robotic arms attached to the servo motor. Each robotic arm can be coupled to a golf club. The remote golf club testing module can include program code for receiving from a remote operator over a computer communications network a set of swing parameters defining different aspects of a golf club swing, for directing a plurality of robotic arms of the fixture to swing a coupled golf club according to the received swing parameters, for sensing a result of the golf club, and for transmitting data derived from the sensed result to the remote operator over the computer communications network.

In another embodiment of the invention a remote golf club testing method can be provided. In an embodiment of the invention, a set of swing parameters from a remote operator can be received over a computer communications network. The swing parameters can define different aspects of a golf club swing. A plurality of robotic arms in a robotic golf club swing fixture can be directed to swing the attached golf club. Performance of the golf club can be sensed and the data derived from the performance can be transmitted to the remote operator over the computer communications network.

Additional aspects of the invention will be set forth in part in the description which follows, and, in part, will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and, together with the description, serve to explain the principles of the invention. The embodiments illustrated herein are presently preferred; it is understood, however, that the invention is not limited to the precise arrangements and instrumentalities shown, wherein.

DETAILED DESCRIPTION OF THE INVENTION

Embodiments of the invention provide for remotely swinging a golf club. In accordance with an embodiment of the invention, a remote operator can specify one or more parameters associated with the swinging of a golf club, such as power and direction. The specified parameters can be provided over a computer communications network to a remotely disposed robotic test fixture configured to swing a golf club through the activation of one or more robotic arms. Thereafter, the robotic test fixture can swing the golf club according to the received parameters and the resulting performance of the golf club and/or the shot can be measured. Finally, the resulting measurements can be provided to the remote operator over the network such that the performance of the golf club and/or the ball subsequent to the swing can be presented and visualized by the remote operator without requiring the remote operator to be physically present in the same place as where the golf club hit the golf ball.

Figure 1:
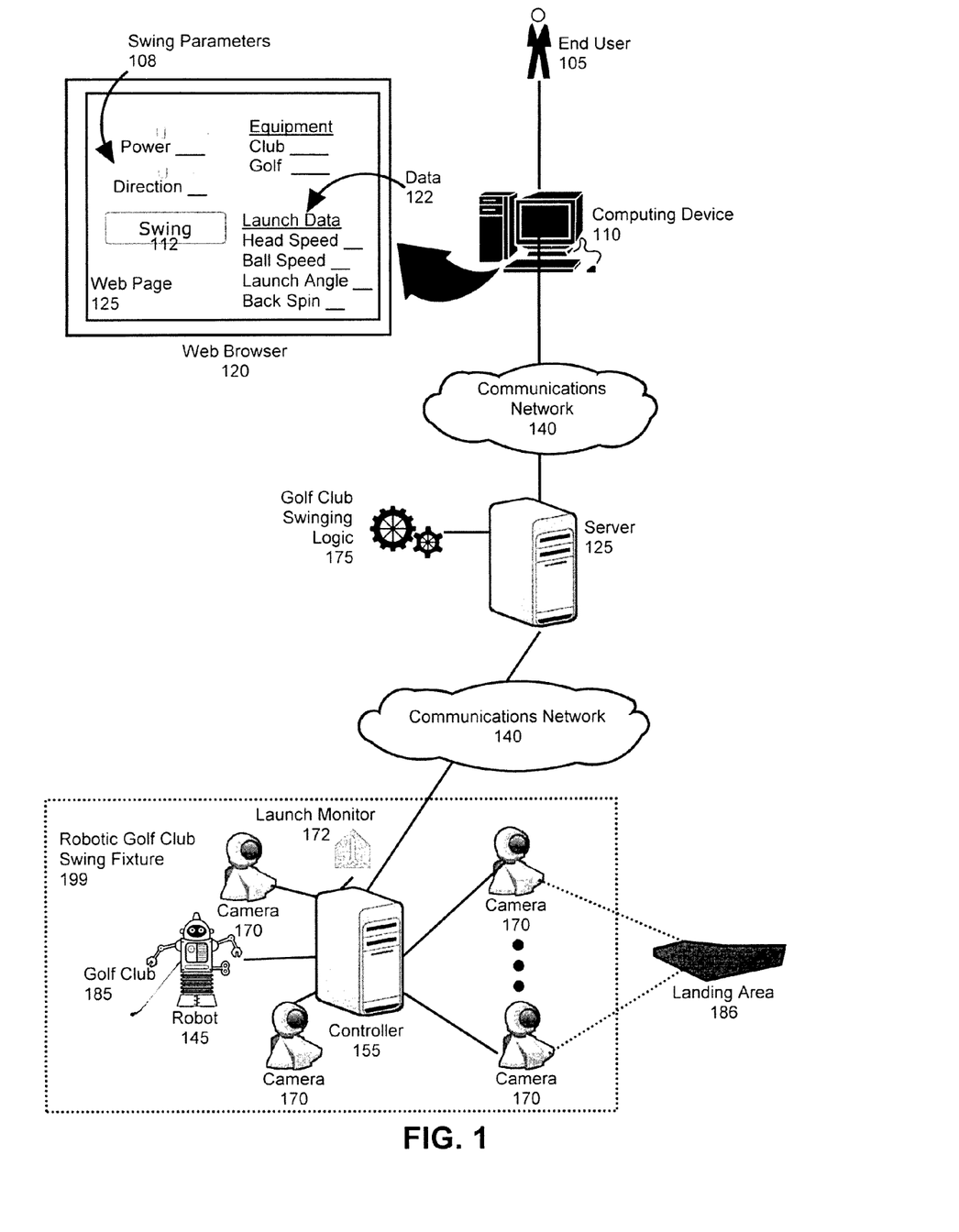
FIG. 1 is a pictorial illustration of a process for remotely swinging a golf club.

In further illustration, FIG. 1 depicts a process for remotely swinging a golf club. As shown in FIG. 1, an end user 105 on a computing device 110 can set multiple, different swing parameters 108 via different graphical user interfaces from a web page 125 in a web browser 120. The swing parameters 108 can define different aspects of a golf club swing, including but not limited to direction, velocity, power, and shot shape. Further, the swing parameters 108 can be presented as a percentage or a number, for instance from one through one hundred, where one can be the lowest value and one hundred can be the highest value. Once the end user 105 is satisfied with his or her selections, the end user 105 can select a "Swing" button 112 or another graphical user interface.

The selection of the "Swing" button 112 can cause the swing parameters 108 to be sent over a communication network 140, such as the Internet, to a server 125. Golf club swinging logic 175 executing on the server 125 can format the swing parameters 108. In one embodiment, golf club swinging logic 175 can format the swing parameters 108 to a data string. Golf club swinging logic 175 can forward the swing parameters 108 to robotic golf club swing fixture 199 over a communications network 140. The robotic golf club swing fixture 199 can include a controller 155. The controller 155 can direct a robot 145 to swing an attached golf club 185 using the swing parameters 108. In another embodiment, the golf club swinging logic 175 can be executed in memory on the controller 155 which can format the swing parameters 108 to a data string. The controller 155 can forward the swing parameters 108 to robotic golf club swing fixture 199 over a serial cable or other cable connection. The golf club 185 can be further in contact with a golf ball. When the golf club 185 is swung by the robot 145, the golf ball can be hit and take flight. Of note, the controller 155 can be coupled to the robot 145 via a serial cable.

The controller 155 can capture data—for instance, launch data related to the golf club swing and to the flight of the golf ball. In an embodiment, golf club swinging logic 175 can calculate data 122 from any (raw) data captured by the controller 155 during a golf swing. In a different embodiment, a controller 155 can generate the data 122 directly for each golf club swing. In another embodiment, a computer program executing in memory on the controller can capture and/or calculate any data 122 related to a golf club swing and/or the motion of a golf ball. Further, in yet even another embodiment, multiple, different external devices, such as cameras 170, launch monitors 172, and tracking apparatus, can be used to capture information or data 122 related to the golf club swing and/or flight of the ball. For instance, a launch monitor 172 may capture launch conditions related to the swing of the golf club 185 and of a ball being struck by the club 185. Further, cameras 170 can be positioned in such a way to capture the swing of the golf club 185, the contact between the club 185 and ball as well the flight and landing of a ball around a landing area 186. Of note, the landing area 186 can be outside. Thus, in a embodiment, a robotic golf club swing fixture 199 can be operated remotely and data 122 can be recorded with cameras 170 and launch monitors 172 to show a golf club swing and how the ball flies and where the ball lands as a result of the swing outside. Data 122 related to the golf club swing and to the flight of the ball can include but is not limited to head speed, ball speed, vertical launch angle, horizontal launch angle, back spin, side spin, peak trajectory, descent angle, descent velocity, carry dispersion, carry distance, total dispersion, and total distance.

Optionally, a golf simulator can be present. Note a golf simulator can be coupled to different components depending on how it is being used. In an embodiment, data captured from the resulting swing of the coupled club 185 by at least one camera 170 and/or at least one launch monitor 172 can be sent to a coupled golf simulator. More specifically, in an embodiment, the golf simulator can be coupled to the controller 155. Of note, it is contemplated that a computer program or programs on the golf simulator, the controller 155, the server 200, or other component, can determine from the raw data sensed from the swing the resulting effect on a golf ball. In other words, the club 185 is swung by the robot and the raw data can be collected and be processed by several different components. The movement of the ball can be displayed to an end user 105 via the golf simulator, in one embodiment. Further, the golf simulator can display information related to accuracy (to the hole), distance (to the hole), and who (which player, in a game setting, for instance) is closest to the pin. In a different embodiment, the golf simulator can replace the launch monitor 172, thus directly capturing the data resulting from a golf swing. In another embodiment, the golf simulator can be an external apparatus that can detect swing data directly from the controller 155. In yet another embodiment, the golf simulator uses the data captured by the launch monitor 172, but may calculate results so as predict the result of the golf ball using an algorithm. In yet a further embodiment, golf simulator can be coupled to the server 200 and can receive swing parameters 108 from the golf club swing logic 175 upon a user selecting a swing button 112 after selecting swing parameters 108. The golf simulator can use the raw data to calculate the launch data 122 and then display the theoretical movement of the golf ball to an end user 105 based on the calculations. In other words, in an embodiment, the robotic golf club swing fixture 199 is actually not swung, but a potential outcome is calculated by the simulator and displayed to an end user 105. Of note, if an embodiment where there is no hitting a physical golf ball, a landing area 186 is not needed. Depending on how a golf simulator is being used, the simulator can further display the theoretical swing or the actual swing (captured by the cameras 170) as well as the trajectory and resulting location of the golf ball without requiring the ball and/or the robotic golf club swing fixture 199 to be located outside.

In addition, the robotic golf club swing fixture 199 can further include at least one camera 170 coupled to the controller 155 can capture the golf swing and/or the motion of the golf ball. In one embodiment, at least one camera 170 can be a web camera, and the golf club swing and/or the motion of the golf ball can be streamed to the end user via a website, content browser, or a web browser 120. The data 122 related to the golf club swing can be transmitted to the end user 105 over the computer communications network 140 and can be displayed on a web page 125, in a web browser 120, or other content browser. Of note, the web page 125 can include additional information related to the swinging of a golf club and to the conditions during which the golf club 185 is being swung, including information related to weather, equipment, and terrain. In another embodiment, one or more cameras 170 can be set at the golf ball landing area 186, such as a golf green, to show the end user 105 the golf ball landing position relative to a golf green or fairway. The camera(s) 170 located at a golf ball landing area 186 can be coupled to the controller 155, thus, being part of the robotic golf club swing fixture 199 or be separate, but capable of transmitting data (information) via a computer communications network to the controller 155 of the fixture 199 and/or to the server 125 on which the golf club swinging logic 175 is executing.

Figure 2:
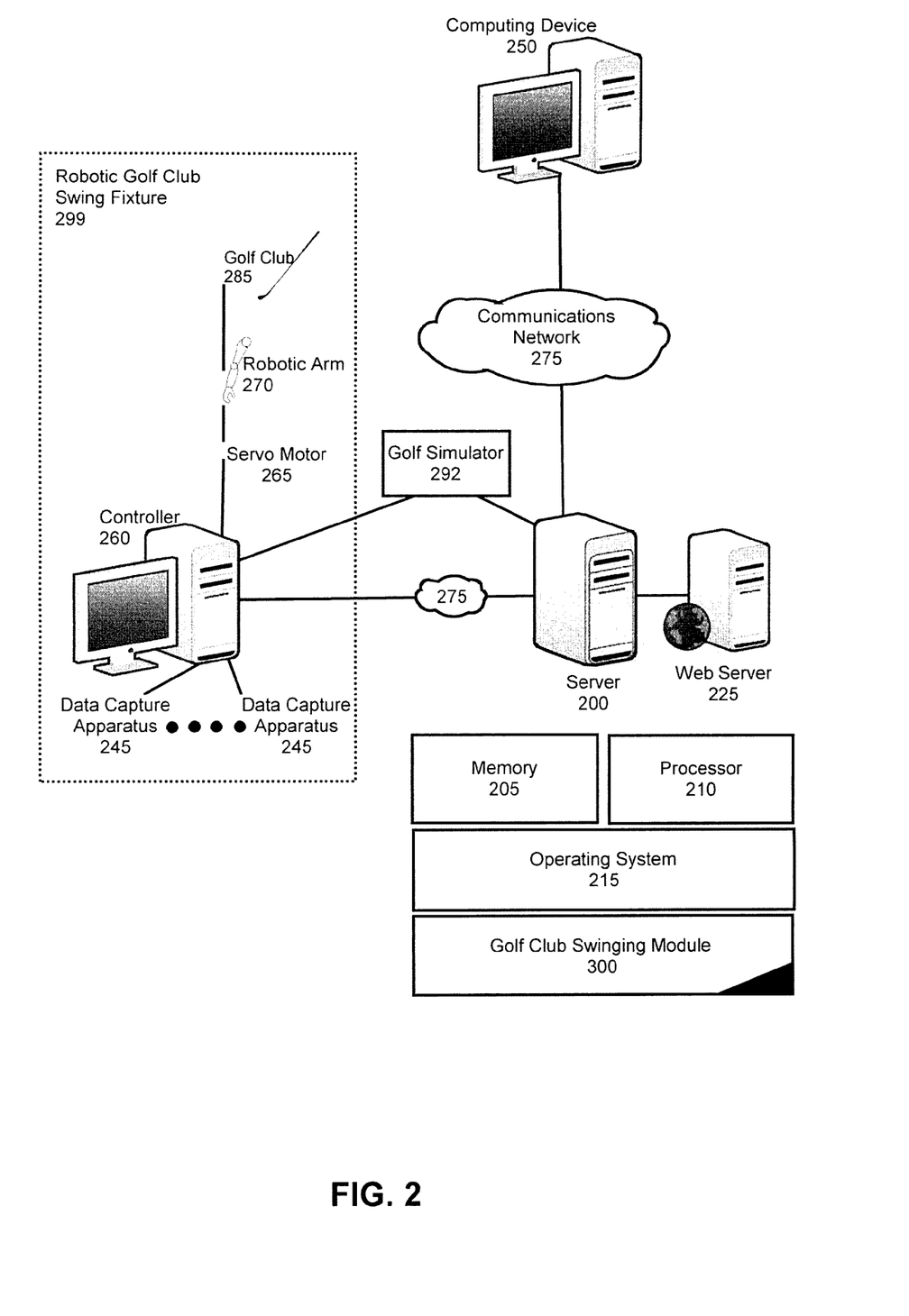
FIG. 2 is a schematic illustration of a remote swinging system configured for remotely swinging a golf club; and, FIG. 3 is a flow chart illustrating a process for remotely swinging a golf club.

The process described in connection with FIG. 1 can be implemented in a golf club swinging system. In further illustration, FIG. 2 is a schematic illustration of a remote swinging system configured for remotely swinging a golf club. The system can include a server 200 with at least one processor 210 and memory 205 supporting the executing of an operating system (O/S) 215. A golf club testing module 300 can execute in memory 205 of the server 200 as well as be coupled via a communications network 275 to a robotic golf club swing fixture 299. Of note, a golf club testing module 300 can additional be executing in memory of a controller 260 of the robotic golf club swing fixture 299 (not pictured). The server 200 can be coupled to a computing device 250, which a remote operator (an end user) from a web site can select a set of swing parameters defining different aspects of a golf swing. Further, the server 200 can be coupled via a communications network 275 to a web server 225 as well as the robotic golf club swing fixture 299. An optional golf simulator 292 can further be coupled to either the controller 260 or the server 200 depending on how the golf simulator is being used as will be further explained below.

The robotic golf club swing fixture 299 can include multiple, different data capture apparatuses 245, a controller 260, at least one servo motor 265, a plurality of robotic arms 270, and multiple, different golf clubs 285. The multiple, different data capture apparatuses 245 can be hardware, such as launch monitors and cameras, that are coupled to the controller 260. The data capture apparatuses 245 can be used to capture data related to the swing of the golf club 285 and/or the golf ball, such as, but not limited to, the impact of the club 285 on a ball, launch conditions of a ball, and ball flight and landing. Of note, in one embodiment, the computer program or programs used to run the different data capture apparatuses 245 can be executed in memory of the controller 260. Further, the devices can be run independently or together. Of further note, as noted above, the golf club swinging module 300 can be executing in memory on the controller 260. It is further contemplated that there may be an embodiment, where any functionality performed by the server 200 is performed by the controller 260. In another embodiment, multiple, separate computers or controllers 260 can be used to operate the data capture apparatuses 245. The controller 260 can be coupled to a servo motor 265, which can send signals to at least one robotic arm 270. Each robotic arm 270 can be coupled to a golf club 285, which upon receiving a signal, prompts the golf club 285 to swing. Of note, in an embodiment, the robotic golf club swing fixtures 299 includes one robotic arm 270 coupled to a single golf club 285.

Of note, in an embodiment, an optional golf simulator 292 can be coupled to the controller 260. In an embodiment, the golf simulator 292 can capture data associated with the swing of a golf club 285 from a data capture apparatus 245, such as a launch monitor. In one instance, a golf ball hit by the swinging golf club 285 in the fixture 299 would hit a screen or similar component coupled to the golf simulator 292. The simulator 292 can capture the data associated with the ball and calculate a variety of parameters associated with the ball when it hits the screen. In another instance, the simulator 292 can capture the data associated with the swing of the club 285. In other words, the screen is just used as a target for the ball and/or to contain the golf ball. In either instance, the golf simulator 292 can calculate and display the flight (the path) and landing (resulting location) of the golf ball.

In another embodiment, the golf simulator 292 can be coupled to the controller 260 and replace at least one data capture apparatus 245, such as the launch monitor or a camera. Of note, a screen or similar component can, but does not have to, be coupled to the golf simulator 292. The golf simulator 292 can capture data related to the golf club swing directly from the controller 260. The golf simulator can then process the data collected as needed so to display the path of the golf ball, the swing of the club 285, and/or the resulting location of the ball to a computing device 250 of an end user. In other words, in an embodiment, an end user can remotely initiate a swing of the swing fixture 299, but instead of physically hitting a coupled golf ball, the resulting data from the swing can be captured and transmitted to the simulator 292. The golf simulator 292 can display a calculated resulting location and/or path of the golf ball based upon the data derived from the sensed result of the swinging of the coupled golf club 285. Further, the golf simulator 292 can display information related to accuracy (to the hole), distance (to the hole), and who (which player, in a game setting, for instance) is closest to the pin.

In another embodiment, a golf simulator 292 can be coupled to a server 200. The golf club swinging module 300 can include program code enabled to send the golf simulator 292 (most likely, without a screen) swing parameters. In one instance, the golf simulator 292 can use the raw data to calculate the launch data and then display the theoretical movement of the golf ball to a computing device 250 of an end user 105 based on the calculations. In this way, the fixture 299 is never swung and a ball not hit; instead, there the golf simulator 292 can calculate the path of the ball and the swing of the club 285 based on the received swing parameters.

Note, that in the embodiments described above, golf club swinging module 300 can perform the tasks described above, such as but not limited to, collecting data, receiving parameters, transmitting parameters, calculating data, displaying resultant data, regardless of where the module 300 is being executed in memory (the server 200, the controller 260, the golf simulator 292, etc.) In other words, it is contemplated that the module 300 can be executing in memory on a variety of computing devices.

As noted above, a robotic golf club swing fixture 299 can be coupled to multiple, different data capture apparatuses 245, including at least one camera. The camera can be a web camera and can stream images of at least one of the plurality of robotic arms swinging the golf club 285 to a remote operator over the communications network 275. Specifically, the images can be streamed to a web site or content browser which a remote operator on a computing device 250 can be using. Additionally at least one camera, such as a web camera, can be located at the target hitting area (or landing area) to show an end user the results of a golf shot, including but not limited to the resulting location of a golf ball struck by the coupled golf club 285 after the swinging of the golf club 285. Of note, the additional camera(s) showing the end user the results of the golf shot, in one embodiment, can be coupled to the controller 260 (part of the robotic golf club swing fixture 299) or, in a different embodiment, the camera(s) can be separate. In any case, the camera(s) can transmit data (information) via a computer communications network to the controller 260 of the fixture 299 and/or to the server 200 on which the golf club swinging module 300 is executing upon. In other words, cameras, regardless of how they are connected, can be located at a target hitting area so as to capture the resulting location of a golf ball and/or the path the ball took and can transmit the data (images) to an end user. Of further note, the camera may be controlled by a computer program executing in memory of the controller 260 or a computer program may be executing in memory of the camera itself. In other words, the data capture apparatuses 245 can operate using any method now known or later developed.

The golf club swinging module 300 can include program code, which when executed by at least one processor 210 on the server 200 can receive from a remote operator over a computer communications network 275 a set of swing parameters defining different aspects of a golf club swing. The remote operator can select the set of parameters from a web page being displayed on a computing device 250. Upon receiving a set of swing parameters, the golf club testing module 300 can further include program code that can direct the plurality of robotic arms 270 to swing the coupled golf club 285 according to the received swing parameters. Of note, multiple robotic arms 270 can be coupled to each servo motor 265 or just one robotic arm 270 can be coupled to each servo motor. The module 300 can further include program code to sense a result of the swinging of the coupled golf club and the data derived from the sensed result can be transmitted to the remote operator over the computer communications network. The result of the swung golf club can include, but is not limited to, a sensed performance of the golf club, a resulting location of a golf ball struck by the coupled golf club subsequent to the swinging of the coupled golf club.

Optionally, the module 300 can include program code to transmit the data derived from the sensed result to a golf simulator 292. If needed (depending of the type and/or format of the data sent), the golf simulator 292 can process the data in order to display the theoretical movement of the golf ball to an end user in response to the swinging of the golf club 285. In other words, in an embodiment, an end user can remotely initiate a swing of the swing fixture 299, but instead of physically hitting a coupled golf ball, the resulting data from the swing can be captured and transmitted to the simulator 292. The golf simulator 292 can display a calculated resulting location and/or path of the golf ball based upon the data derived from the sensed result of the swinging of the coupled golf club 285. Further, the golf simulator 292 can display information related to accuracy (to the hole), distance (to the hole), and who (which player, in a game setting, for instance) is closest to the pin.

Figure 3:
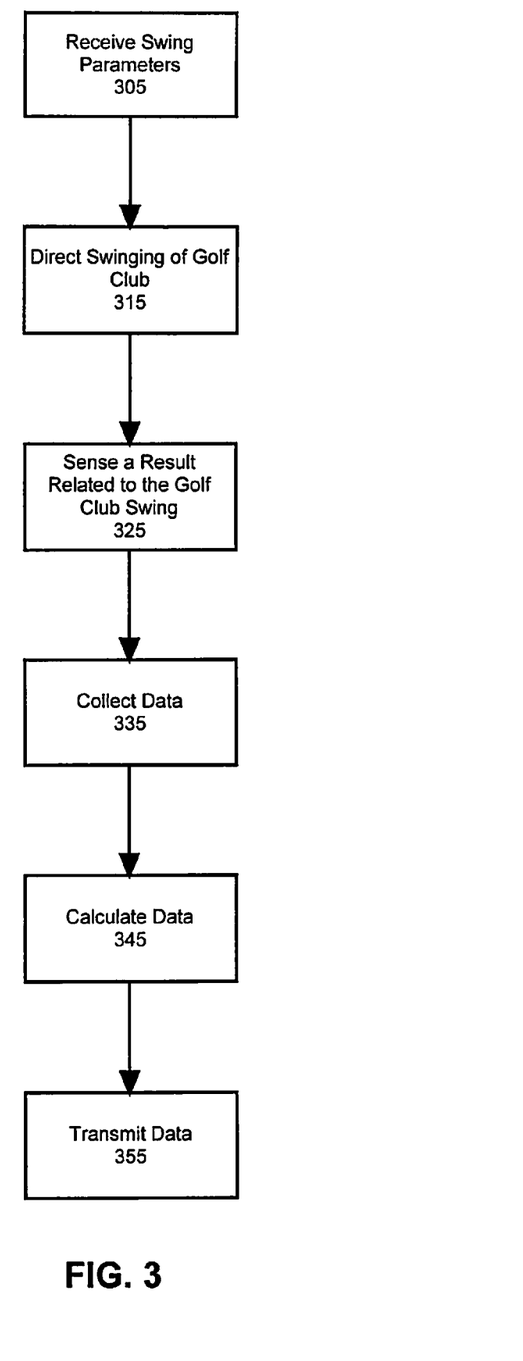

In even further illustration of the operating of the program code of the golf club swinging module, FIG. 3 is a flow chart illustrating a process for remotely swinging a golf club. Beginning in block 305, a set of swing parameters defining different aspects of a golf club swing can be received from a remote operator over a computer communications network. The swing parameters can include, but are not limited to, direction, velocity, power, and shot shape. The swing parameters can be selected by a remote operator using a graphical user interface displayed on a website. Of note, a remote operator can be an end user using a computing device. Of further note, the swing parameters can be converted to data format, if required, so that the swing parameters can be forwarded to a plurality of robotic arms of a robotic golf club test fixture, so that the plurality of robotic arms can be directed to swing a coupled golf club according to the received swing parameters, as shown in block 315. Of note, the golf club can also be in contact with a golf ball, so that when a robotic arm is directed to be swung, the golf club strikes the golf ball causing the golf ball to move.

In response to the golf club swing, a result of the swinging golf club can be sensed, as illustrated in block 325. The sensed result of the swinging golf club can include sensing the performance of the golf club as well as a resulting location of a golf ball struck by the coupled golf club subsequent to the swinging of the coupled golf club. Additional data related to a golf club or golf ball can be sensed. The data sensed can be collected, as shown in block 335. Data capture apparatuses, such as cameras, launch monitors, tracking devices, etc. (or the computer programs operating these apparatuses) may only capture raw data related to the golf club swing and/or the flight of a golf ball; therefore, this data may need to be collected for further processing. Though, it is noted, the data capture apparatuses may be able to analyze the data related to the impact of the ball upon the swinging of the golf club, launch conditions of the ball, ball flight, and ball landing. Of note, if necessary, the module 300 can calculate data from the collected data, as indicated in block 345. In other words, if the data captures apparatuses (or the related computer programs) do not analyze the raw data, the raw data may need to be manipulated so that more useful data can be derived, such as launch data related to the golf club swing and/or the golf ball, including but not limited to head speed, ball speed, vertical launch angle, horizontal launch angle, back spin, side spin, peak trajectory, descent angle, descent velocity, carry dispersion, carry distance, total dispersion, and total distance. Upon data being derived (collected and/or calculated) from the sensed result of the golf swing, the data derived can be transmitted, as shown in block 355. The data can be transmitted to a remote operator over the computer communications network. In one embodiment, the data can be transmitted to a remote operator so as to be displayed on a web page via a web browser. In another embodiment, the data can first be transmitted to a golf simulator. The golf simulator can then display a resulting location and/or path of the golf ball based upon the data collected in block 335 to the remote operator. If necessary, the golf simulator can calculate a predicted result of the golf ball based on the sensed result of the golf club swing.

In addition to a remote golf club swinging method, the invention herein can further be used to remotely test a golf club. In a embodiment, a remote golf club testing method can include receiving in a robotic golf club swing fixture from a remote operator over a computer communications network a set of swing parameters defining different aspects of a golf club swing, directing a plurality of robotic arms of the fixture to swing a coupled golf club according to the received swing parameters, sensing performance of the golf club, and transmitting data derived from the sensed performance to the remote operator over the computer communications network.

Another embodiment of the invention can include a remote golf club testing system. The system can include a server configured for communicative coupling to a web server and a computing device. A robotic golf club swing fixture also can be provided and can include a servo motor coupled to a controller and a plurality of robotic arms attached to the servo motor. In one embodiment, the robotic golf club swing fixture can include one robotic arm. In another embodiment, the robotic golf club swing fixture can include multiple, different robotic arms. Each robotic arm can be coupled to a golf club. The remote golf club swinging module can include program code for receiving from a remote operator over a computer communications network a set of swing parameters defining different aspects of a golf club swing, for directing a plurality of robotic arms of the fixture to swing a coupled golf club according to the received swing parameters, for sensing performance of the golf club, and for transmitting data derived from the sensed performance to the remote operator over the computer communications network. The swing parameters can include, but are not limited to direction, power, and velocity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the aforementioned. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the aforementioned. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the aforementioned. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is also understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A remote golf club swinging method comprising:
   receiving, by a processor executing in a memory of a computer and coupled to a robotic golf club swing fixture, from a remote operator over a computer communications network a set of swing parameters including direction and shot shape defining different aspects of a golf club swing in response to the remote operator setting the set of swing parameters in a graphical user interface (GUI) in a web browser on a computing device remotely disposed from the robotic golf club swing fixture, where shot shape indicates a shape of a shot of a golf ball in reference to golf ball flight upon a golf club making contact with the golf ball;
   directing, by the processor, a plurality of robotic arms of the robotic golf club swing fixture to swing a coupled golf club resulting in the remote operator remotely causing the robotic golf club swing fixture to swing the coupled golf club according to the set of swing parameters set via the GUI, wherein directing the plurality of robotic arms comprises transforming, by the processor, the received set of swing parameters to a data string;
   sensing, by the processor, a result of the swinging of the coupled golf club; and,
   transmitting, by the processor, data derived from the sensed result to the remote operator for display in the web browser on the computing device over the computer communications network, wherein the result is a sensed performance of the golf club.

2. The method of claim 1, wherein the result is a resulting location of the golf ball struck by the coupled golf club subsequent to the swinging of the coupled golf club.

3. The method of claim 1, wherein a swing parameter is power.

4. The method of claim 1, wherein a swing parameter is velocity.

5. The method of claim 1, wherein the robotic golf club swing fixture has one robotic arm.

6. The method of claim 1, further comprising calculating, by the processor, data derived from the sensed result.

7. The method of claim 1, wherein the data derived from the sensed result includes a resulting location of the golf ball struck by the swung golf club coupled to the plurality of robotic arms of the robotic golf club swing fixture.

8. The method of claim 7, wherein the resulting location of the golf ball is a distance to a hole.

9. The method of claim 1, wherein transmitting, by the processor, the data derived from the sensed result to the remote operator for display in the web browser on the computing device over the computer communications network comprises:
   transmitting, by the processor, the sensed result to a golf simulator comprising program code executed by the processor;
   calculating, by the golf simulator, the data derived from the sensed result; and,
   displaying, by the golf simulator, a theoretical movement of the golf ball to the remote operator.

10. The method of claim 9, wherein displaying, by the golf simulator, the theoretical movement of the golf ball to the remote operator, comprises displaying at least one of a swing of the coupled golf club, a trajectory of the golf ball, and a resulting location of the golf ball without requiring the golf ball and the robotic golf club swing fixture to be located outside.

11. The method of claim 9, wherein displaying, by the golf simulator, the theoretical movement of the golf ball to the remote operator, comprises displaying at least one of an accuracy of the golf ball to a hole, a distance to the hole, and a player whose golf ball landed closest to the hole.

12. A remote golf club swinging system comprising:
   a server configured for communicative coupling to a web server and a computing device;
   a robotic golf club swing fixture comprising at least one servo motor coupled to a controller and at least one data capture apparatus coupled to the controller, each servo motor coupled to a plurality of robotic arms, each of the plurality of robotic arms coupled to a golf club; and,
   a golf club swinging module executing in a memory of the server and also coupled to the robotic golf club swing fixture, the golf club swinging module comprising program code enabled to receive from a remote operator over a computer communications network a set of swing parameters including direction and shot shape defining different aspects of a golf club swing in response to the remote operator setting the set of swing parameters in a graphical user interface (GUI) in a web browser on the computing device remotely disposed from the robotic golf club swing fixture, where shot shape indicates a shape of a shot of a golf ball in reference to golf ball flight upon a golf club making contact with the golf ball, to direct the plurality of robotic arms of the robotic golf club swing fixture to swing the coupled golf club resulting in the remote operator remotely causing the robotic golf club swing fixture to swing the coupled golf club according to the set of swing parameters set via the GUI, wherein directing the plurality of robotic arms comprises transforming the received set of swing parameters to a data string, to sense a result of the swinging of the coupled golf club, and to transmit data derived from the sensed result to the remote operator for display in the web browser on the computing device over the computer communications network, wherein the result is a sensed performance of the golf club.

13. The system of claim 12, wherein the result is a resulting location of the golf ball struck by the coupled golf club subsequent to the swinging of the coupled golf club.

14. The system of claim 12, wherein a swing parameter is power.

15. The system of claim 12, wherein a swing parameter is velocity.

16. The system of claim 12, wherein the robotic golf club swing fixture has one robotic arm.

17. The system of claim 12, further comprising a golf simulator coupled to the server.

18. The system of claim 12, further comprising a golf simulator coupled to the controller.

19. A computer program product for remotely swinging a golf club, the computer program product comprising:
   a non-transitory computer readable storage medium containing computer instructions stored therein for causing a computer processor to perform:
   receiving, by the computer processor coupled to a robotic golf club swing fixture, from a remote operator over a computer communications network a set of swing parameters including direction and shot shape defining different aspects of a golf club swing in response to the remote operator setting the set of swing parameters in a graphical user interface (GUI) in a web browser on a computing device remotely disposed from the robotic golf club swing fixture, where shot shape indicates a shape of a shot of a golf ball in reference to golf ball flight upon a golf club making contact with the golf ball;
   directing, by the computer processor, a plurality of robotic arms of the robotic golf club swing fixture to swing a coupled golf club resulting in the remote operator remotely causing the robotic golf club swing fixture to swing the coupled golf club according to the set of swing parameters set via the GUI, wherein directing the plurality of robotic arms
comprises transforming, by the computer processor, the received set of swing parameters to a data string;
   sensing, by the computer processor, a result of the swinging of the coupled golf club; and,
   transmitting, by the computer processor, data derived from the sensed result to the remote operator for display in the web browser on the computing device over the computer communications network, wherein the result is a sensed performance of the golf club.

20. The computer program product of claim 19, wherein a swing parameter is power.

21. The computer program product of claim 19, wherein a swing parameter is velocity.

22. The computer program product of claim 19, wherein the result is a resulting location of the golf ball struck by the coupled golf club subsequent to the swinging of the coupled golf club.

23. The computer program product of claim 19, wherein the robotic golf club swing fixture has one robotic arm.

24. A remote golf club testing method comprising:
   receiving, by a processor executing in a memory of a computer and coupled to a robotic golf club swing fixture, from a remote operator over a computer communications network a set of swing parameters including direction and shot shape defining different aspects of a golf club swing in response to the remote operator setting the set of swing parameters in a graphical user interface (GUI) in a web browser on a computing device remotely disposed from the robotic golf club swing fixture, where shot shape indicates a shape of a shot of a golf ball in reference to golf ball flight upon a golf club making contact with the golf ball;
   directing, by the processor, a plurality of robotic arms of the robotic golf club swing fixture to swing a coupled golf club resulting in the remote operator remotely causing the robotic golf club swing fixture to swing the coupled golf club according to the set of swing parameters set via the GUI, wherein directing the plurality of robotic arms comprises transforming, by the processor, the received set of swing parameters to a data string;
   sensing, by the processor, performance of the golf club; and,
   transmitting, by the processor, data derived from the sensed performance to the remote operator for display in the web browser on the computing device over the computer communications network, wherein the result is a sensed performance of the golf club.

\* \* \* \* \*